(12) United States Patent
Otsuka

(10) Patent No.: US 7,588,159 B2
(45) Date of Patent: Sep. 15, 2009

(54) FUEL CAP FOR VEHICLE

(75) Inventor: Hiroyuki Otsuka, W. Bloomfield, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 783 days.

(21) Appl. No.: 11/255,488

(22) Filed: Oct. 21, 2005

(65) Prior Publication Data

US 2007/0090113 A1   Apr. 26, 2007

(51) Int. Cl.
  B65D 53/00 (2006.01)
  B65D 55/02 (2006.01)
(52) U.S. Cl. ............................... 220/304; 220/DIG. 33; 215/220
(58) Field of Classification Search ................. 220/304, 220/378, DIG. 32, DIG. 33, 293, 295, 296, 220/298, 288; 215/220
See application file for complete search history.

(56) References Cited

U.S. PATENT DOCUMENTS

| 4,007,849 A | 2/1977 | Hinkle |
| 4,765,505 A | 8/1988 | Harris |
| 5,449,086 A | 9/1995 | Harris |
| 5,480,055 A | 1/1996 | Harris et al. |
| 5,638,975 A | 6/1997 | Harris |
| 5,904,057 A * | 5/1999 | Abney et al. .................. 70/167 |
| 6,745,914 B2 | 6/2004 | Hagano et al. |

* cited by examiner

Primary Examiner—Anthony D Stashick
Assistant Examiner—Jeffrey Allen
(74) Attorney, Agent, or Firm—Young Basile

(57) ABSTRACT

A fuel cap for closing a filler neck of a fuel tank for a vehicle includes a cover pivotally supporting a handle for movement between an extended position and a retracted position. The cover encloses an outwardly extending flange portion of a threaded closure body. Ratchet teeth are formed on a wall of the cover opposite from the wall pivotally supporting the handle. The handle operably engages a surface of the flange portion for moving the ratchet teeth toward the opposite surface of the flange portion. The opposite surface of the flange portion includes corresponding ratchet teeth engageable with the ratchet teeth of the cover when the handle is in an extended position. A biasing member urges the intermeshing ratchet teeth toward a disengaged position when the handle is in the retracted position.

6 Claims, 2 Drawing Sheets

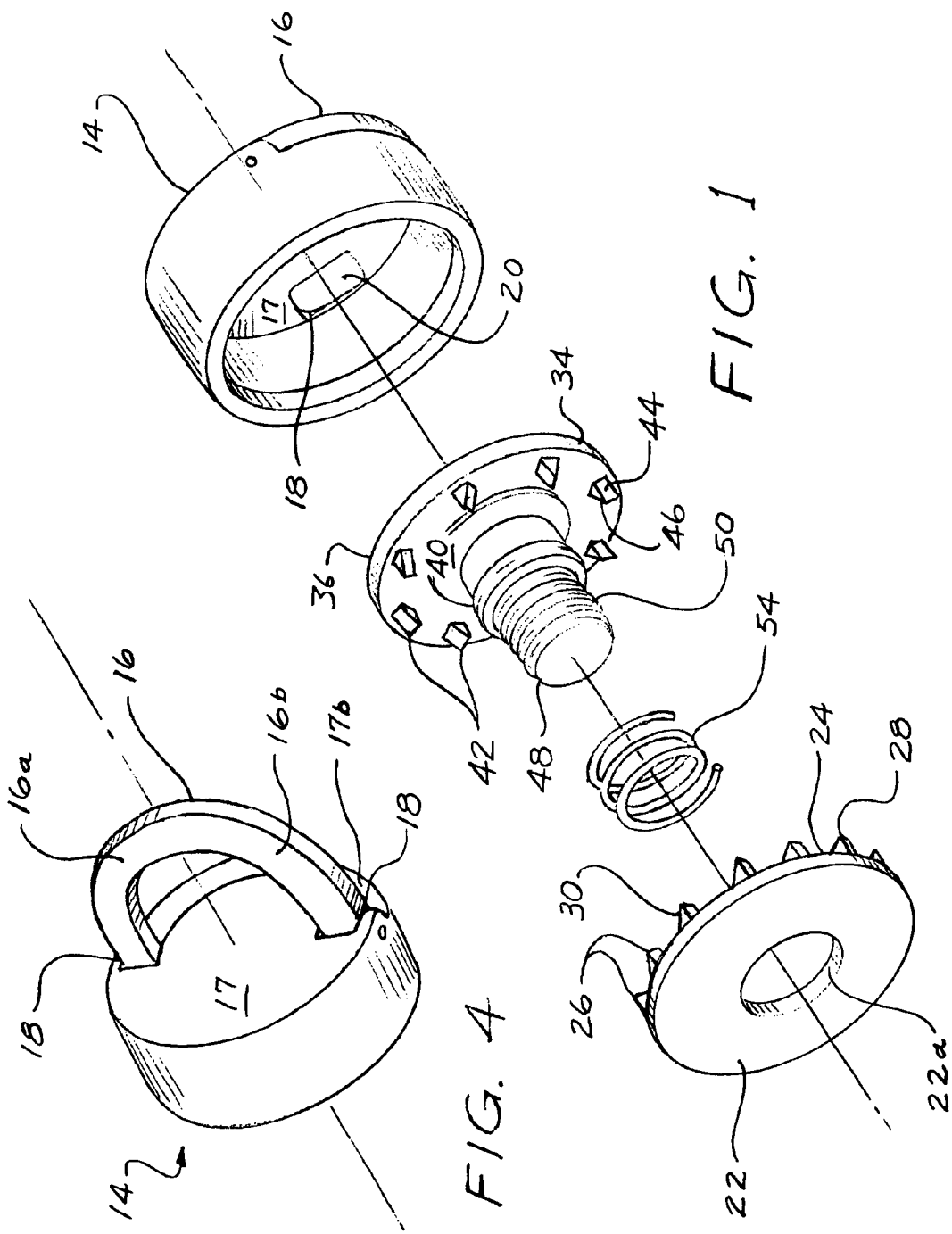

ent invention relates to a fuel cap for closing a filler
FUEL CAP FOR VEHICLE

BACKGROUND

The present invention relates to a fuel cap for closing a filler neck opening of a fuel tank for a vehicle, and more particularly to a threaded fuel cap that maintains a tight seal when subjected to an external force and/or deformation.

A fuel cap device having a raiseable handle pivotally connected to the cover is known in U.S. Pat. No. 6,745,914. By raising the handle to a handling position and applying rotational torque, rotational torque is transmitted to the casing body via a clutch mechanism and a torque transmission mechanism in order to open or close the filler neck opening of a fuel tank of a vehicle. The handle can be lowered to a retracted position when released, where the clutch mechanism assumes a non-transmission mode, and the cover and handle rotate freely if subjected to an external force, such as during a collision.

The clutch mechanism disclosed includes a first configuration with teeth formed all the way around an inside rim of a sidewall, each tooth formed having a substantially right triangular shape in cross-section. On an outside rim of a torque member there are provided clutch arms for interlocking with an interlocking surface of the teeth. This clutch mechanism transmits rotational torque applied to the cover in the closing direction when the handle is in the raised position. A second clutch configuration is disclosed for transmitting rotational torque applied in the opening direction to the handle, only when the handle is in the raised position.

SUMMARY OF THE INVENTION

It would be desirable to reduce the risk of a fuel cap opening in the event of an accident in which an external force is applied to the cap or when the cap or its handle is deformed by an external force.

In accordance with one aspect of the present invention, a fuel cap assembly includes a closure body rotatable about a central axis in opening and closing directions and adapted for insertion into a filler neck opening; a cover rotatable about the central axis in opening and closing directions and moveable axially inwardly and outwardly relative to the closure body; and clutch portions on the cover and on the closure body. When the clutch portions are engaged with each other, they translate rotational movement of the cover to the closure body. When the clutch portions are disengaged, the cover may spin freely relative to the closure body. The clutch portions are arranged to engage with each other in response to outward axial movement of the cover relative to the closure body, and to disengage with each other in response to inward axial movement of the cover relative to the closure body. This arrangement serves to ensure that inward crushing axial movement of the cover, such as in an accident, will not have the effect of engaging the clutch portions with consequent opening of the filler neck and spillage of fuel.

BRIEF DESCRIPTION OF THE DRAWINGS

The description herein makes reference to the accompanying drawings wherein like reference numerals refer to like parts throughout the several views, and wherein:

FIG. 1 is an exploded perspective view of a fuel cap according to an embodiment disclosed herein, including a cover and a closure body;

FIG. 4 is a perspective view of the cover illustrating the handle in an extended or standing position.

DETAILED DESCRIPTION

Figure 3:
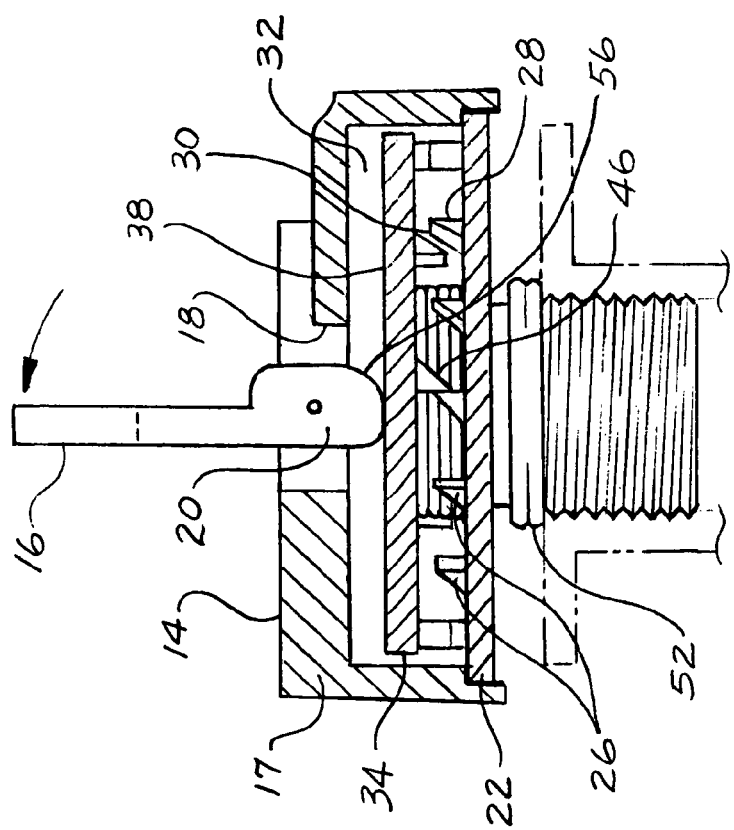
FIG. 3 is a side elevational view of the fuel cap of FIG. 1 with portions broken away illustrating the handle in an extended or standing position and the ratchet teeth of the cover engaged with the ratchet teeth of the closure body.
Figure 2:
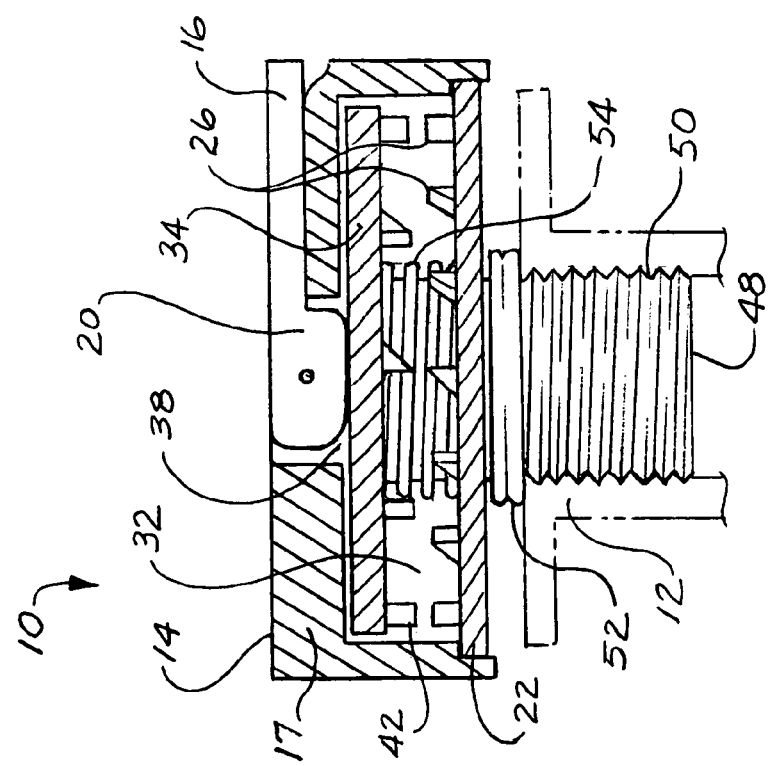
FIG. 2 is a side elevational view of the fuel cap of FIG. 1 with portions broken away illustrating a handle on the cover in a retracted or folded position and ratchet teeth on the cover disengaged from ratchet teeth on the closure body.

A fuel cap 10 according to an embodiment of present invention for closing a filler neck opening 12 (shown in phantom in FIG. 2) of a fuel tank for a vehicle or other fuel system is illustrated in FIGS. 1 through 4. Fuel cap 10 includes a shell or cover 14 having an actuator in the form of a handle 16 pivotally connected for movement between an inoperative, retracted or folded position as illustrated in FIG. 2 and an operative, extended or standing position as shown in FIGS. 3 and 4. Referring to FIG. 4, handle 16 has a bifurcated or horseshoe configuration, including arms 16a and 16b, and includes downstanding actuator portions 20 at the free end of each arm.

Cover 14 includes an outer wall 17 with having apertures 18 adjacent the pivotal connections of handle 16, allowing actuator portions 20 of handle 16 to extend inwardly into an interior of cover 14 when handle 16 is moved from the retracted or folded position to the extended or standing position.

Handle 16 in its retracted position is received in a horseshoe shaped recess 17b formed in the upper face of the outer wall 17 so that the retracted handle is substantially flush with the exterior face of outer wall 17. Although this configuration is viewed as advantageous, the invention does not require that the retracted position of handle 16 be flush with the exterior face of outer wall 17.

Cover 14 also includes an opposite inner wall 22, which in this case is a separate piece suitably attached to cover 14. Alternatively, inner wall 22 may be integral to cover 14. Inner wall 22 includes an interior radially extending surface 24.

Surface 24 includes a plurality of circumferentially spaced ratchet teeth 26 centered on the central axis of inner wall 22. Each tooth has an extending interlocking face 28 and a sloping face 30 inclined by a predetermined angle with respect to interlocking face 28 to define a substantially right triangular cross-section. Interlocking face 28 is substantially perpendicular to surface 24 and parallel to the axis of cover 14. When cover 14 and associated ratchet teeth 26 are rotated with handle 16 in a clockwise or closing direction, sloping face 30 is the leading surface of each ratchet tooth 26. When cover 14 is rotated by handle 16 in a counter clockwise or opening direction, the leading surface of each ratchet tooth 26 is interlocking face 28.

Cover 14 defines a hollow interior chamber 32 for receiving an outwardly extending flange portion 34 of a closure body 36. Chamber 32 need not be fully enclosed. In this case, closure body 36 is a housing that is inserted into the opening of the fuel tank filler to close it. Flange portion 34 of closure body 36 includes a relatively flat surface 38 facing or opposing the interior face of outer wall 17 allowing operable engagement of surface 38 by the inwardly extending actuator portions 20 of handle 16 extending through apertures 18 in cover 14 when handle 16 is moved to the extended or standing position. Opposite surface 40 of flange portion 34 opposes interior radially extending surface 24 of inner wall 22 of cover 14. Surface 40 of flange portion 34 includes a plurality of circumferentially spaced ratchet teeth 42 centered on the central axis of the flange for operable engagement with the ratchet teeth 26 associated with cover 14 when handle 16 is in the extended or standing position.

Each ratchet tooth 42 includes an extending interlocking face 44 and a sloping face 46 inclined by a predetermined angle with respect to interlocking face 44 to define a substantially right triangular cross-section. Interlocking face 44 is generally perpendicular to surface 40 and parallel to the central axis of closure body 40. Ratchet teeth 42 correspond in position and spacing to ratchet teeth 26 and have a right triangular cross-sectional configuration corresponding to right triangular cross-sectional configuration of teeth 26. In the disclosed embodiment, the number of ratchet teeth 42 is less than the number of ratchet teeth 26 to reduce the cost and complexity of manufacture, but a the numbers of teeth may be equal in other embodiments.

Closure body 36 is configured to threadably engage a threaded filler neck opening 12 in a conventional manner. In the depicted embodiment, closure body 36 includes a generally cylindrical body portion 48 extending outwardly from flange portion 34. Cylindrical body portion 48 includes a threaded region 50 for threading engagement with filler neck opening 12. Cylindrical body portion 48 need not be a solid cylinder or define a continuous cylindrical surface, so long as it can engage threaded filler. As shown in FIG. 1, cylindrical body portion 48 defines a threaded surface about a central axis, about which cover 14 and closure body 36 may also be rotated.

Filler neck opening 12 includes in an outwardly and/or downwardly extending sealing lip. A gasket 52 is provided to seat between the sealing lip and closure body 36 to provide a fluid-tight seal when closure body 36 is fully engaged into filler neck opening 12.

A pressure-vacuum valve assembly (not shown) can be provided in a conventional position within closure body 36. The pressure-vacuum valve assembly can control the venting of fuel vapor from the fuel tank when the pressure within the tank reaches a predetermined above atmospheric level. The pressure-vacuum valve assembly can also control the venting of air into the fuel tank when the pressure in the tank decreases to a predetermined below atmospheric level. Pressure-vacuum valve assemblies are conventional units and well known to those skilled in the art.

Outwardly extending flange portion 34 of closure body 36 is positioned within chamber 32 of shell or cover 14 with cylindrical portion 48 extending downwardly through a central aperture 22a in inner wall 22 for engagement with the filler neck opening. Ratchet teeth 42 on surface 40 of flange portion 34 are in opposing coacting relationship with ratchet teeth 26 on surface 24 of inner wall 22 of cover 14.

As seen in FIG. 2 and FIG. 3, cover 14 may be moved axially relative to closure body 36, in either an inward direction (that is, in a direction toward filler neck opening 12) or an outward direction (that is, in a direction away from the opening of filer neck opening 12). When cover 14 has an outward axial movement, inner wall 22 is moved toward flange 34, thus engaging ratchet teeth 26, 42. When cover 14 has an inward axial movement, inner wall 22 is moved away from flange 34, disengaging ratchet teeth 26, 42.

A biasing member in the form of a coil spring 54 is positioned between flange portion 34 of closure body 36 and inner wall 22 of cover 14 in coaxial relation to cylindrical portion 48 to urge cover 14 in an axially inward direction. As shown in FIG. 2, when handle 16 is in the retracted or folded position, force of coil spring 54 is able to push inner wall 22 to move cover 14 in an axially inward direction until the surface 38 of flange portion 34 abuts the interior face of outer wall 17.

When cover 14 is in this axially inward position, ratchet teeth 26, 42 are disengaged and cover 14 can be rotated in either clockwise or counter-clockwise direction without transferring rotation to closure body 36. The application of an external force on cover 14 will tend to drive cover 14 in a further axially inward direction toward the filler neck opening 12, and thus will not drive ratchet teeth 26 toward ratchet teeth 42. Thus, in accordance with this embodiment of the invention, ratchet teeth 26, 42 maintain the disengaged position even when under an external load.

When handle 16 is moved from the retracted position to the extended or standing position as illustrated in FIG. 3, the inwardly extending actuator portions 20 of handle 16 protrude through apertures 18 and act against surface 38 of flange portion 34 in order to overcome the bias force of spring 54 and drive cover 14 up in axially outward direction, thus placing ratchet teeth 26 and 42 into operable engagement with one another. With handle 16 in the extended or standing position, rotation of handle 16 and cover 14 in either a clockwise or counter-clockwise direction transfers rotational motion to closure body 36 through the interaction of ratchet teeth 26, 42.

When cover 14 is rotated in the clockwise or closing rotational direction, the angle of engaged sloping faces 30, 46 can be selected to limit the maximum rotational torque transmitted from cover 14 to closure body 36. Once the predetermined desired maximum rotational torque is applied, angled sloping faces 30, 46 can allow slipping to occur between cover 14 and handle 16 with respect to closure body 36.

When rotating cover 14 in the counter-clockwise or opening rotational direction, interlocking faces 28, 44 of the corresponding ratchet teeth 26 and 42 engage with one another for transmitting rotational torque from extended handle 16 and cover 14 to closure body 36.

Spring 54 acts as a biasing member, urging handle 16 to return from its extended or standing position to the retracted or folded position, and this action is facilitated by providing rounded or notched corners 56 to the extending actuator portions 20 of handle 16. As handle 16 returns to its retracted or folding position, the bias force of spring 54 moves cover 14 in an axially inward direction so that inner wall 22 moves away from flange portion 34, thus placing ratchet teeth 26 and 42 into a disengaged position. Spring 54 may be substituted with another suitable bias member, including springs of other shapes and configurations, such as leaf springs.

It will be appreciated that ratchets 26, 42 act as portions of clutch to permit selective transfer of rotational motion of cover 14 to closure body 36. In lieu of ratchets, the invention may be practiced with any other suitable mechanism having a clutch-like effect, such as friction plates.

Fuel cap 10 provides an arrangement whereby inward crushing axial movement of the cover relative to the closure body taking place for example in an accident will not have the effect of inadvertently engaging the ratchet teeth with consequent twisting of housing 34 and the potential of opening the fuel cap and spilling fuel.

Fuel cap 10 may be constructed with metal, plastic or other suitable materials. The components shown here as unitary pieces may, if desired, be constructed of multiple sub-components suitably welded, glued or otherwise fastened together.

The invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fuel cap for closing a fuel tank comprising:

a rotatable cover having first and second walls and a hollow interior located between the walls;

a handle pivotally connected to the cover for movement between a standing position and a folded position, a portion of the handle operably extending inwardly into the hollow interior of the cover through at least one aperture located in the cover when the handle is in the standing position;

a plurality of ratchet teeth formed on a radially inwardly extending surface facing the hollow interior and associated with the cover;

a closure housing having a cylindrical portion and an annular flange extending outwardly from the cylindrical portion, the cylindrical portion for sealingly engaging with respect to the filler neck of the fuel tank to be closed, the inwardly extending portion of the handle operably engageable with the annular flange of the closure housing through the aperture located in the cover for axially moving the cover outwardly with respect to the closure housing between an axially inwardly located, ratchet-disengaged position and an axially outwardly located, ratchet-engaged position; and a plurality of ratchet teeth located on a radially outwardly extending surface of the annular flange of the closure housing on a side of the flange opposite from the handle, where the plurality of ratchet teeth formed on the radially inwardly extending surface associated with the cover are in the ratchet-engaged position with respect to the plurality of ratchet teeth formed on the surface of the flange when the handle is in the standing position and the cover is thereby moved to the axially outwardly located, ratchet-engaged position.

2. The fuel cap according to claim 1 further comprising:
a biasing member located between the cover and the flange of the closure housing to bias the cover toward the axially outwardly located ratchet-disengaged position.

3. The fuel cap according to claim 1 further comprising:
each tooth of the ratchet teeth formed on the cover having a substantially right triangular cross section.

4. The fuel cap according to claim 3 further comprising:
each tooth having a substantially perpendicularly extending interlocking surface and a sloped surface extending at a predetermined angle with respect to one another.

5. The fuel cap according to claim 1 further comprising:
each tooth of the ratchet teeth formed on the flange of the closure housing having a substantially right triangular cross section.

6. The fuel cap according to claim 5 further comprising:
each tooth having a substantially perpendicularly extending interlocking surface and a sloped surface extending at a predetermined angle with respect to one another.

* * * * *